March 24, 1970            B. L. KOFF            3,502,260
STATOR VANE LINKAGE FOR AXIAL FLOW COMPRESSORS
Filed Sept. 22, 1967
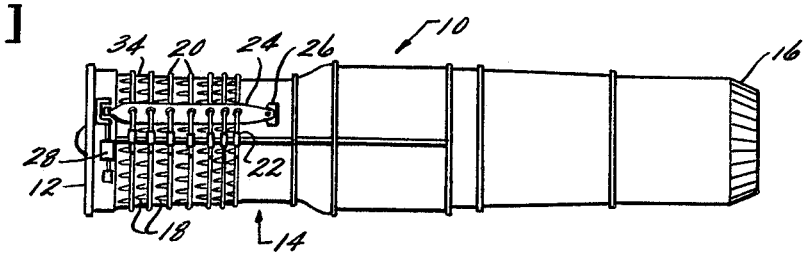
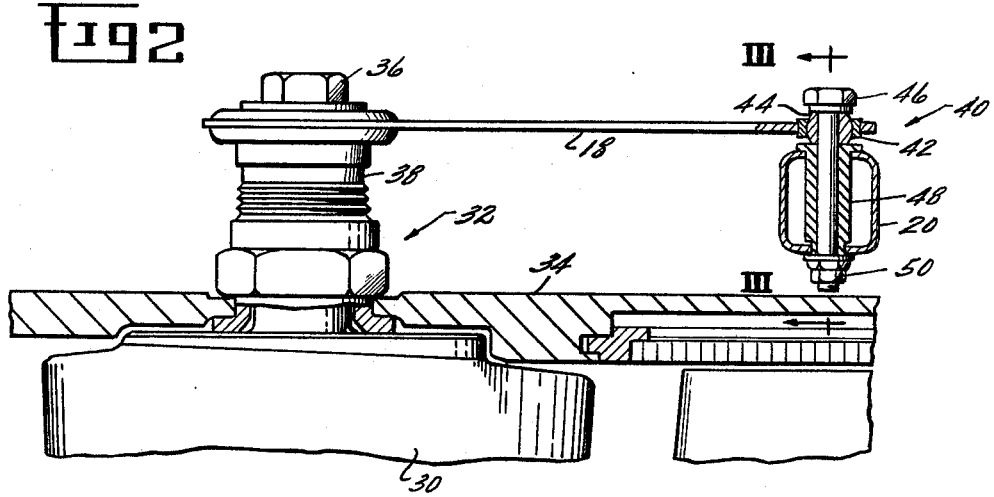
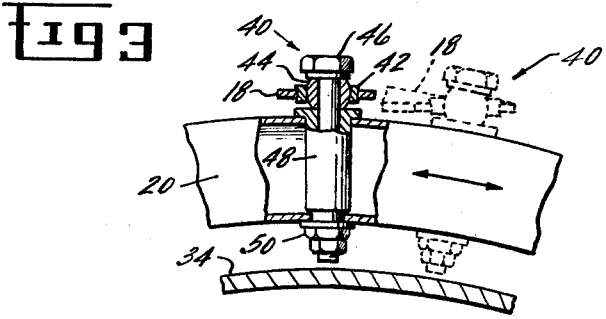
Inventor
BERNARD L. KOFF
ATTORNEY

United States Patent Office 3,502,260
Patented Mar. 24, 1970

3,502,260
STATOR VANE LINKAGE FOR AXIAL
FLOW COMPRESSORS
Bernard L. Koff, Cincinnati, Ohio, assignor to General
Electric Company, a corporation of New York
Filed Sept. 22, 1967, Ser. No. 669,748
Int. Cl. F04d 27/00
U.S. Cl. 230—114                                      4 Claims

ABSTRACT OF THE DISCLOSURE

The disclosure shows an actuation system for variable stators of an axial flow compressor. Unison rings are respectively provided for each circumferential row of adjustable stators and each stator of a given row has a lever arm attached to the unison ring for that row. Means are provided for controlled rotation of the unison rings relative to the axis of the compressor to change the angles of the stators about axes radially of the compressor. The levers are connected to the unison rings by a ball rigidly mounted on the outer surface of the unison ring and a corresponding socket secured to the free end of the lever.

---

The invention described and claimed in the United States patent application herein resulted from work done under United States Government contract FA–SS–66–6. The United States Government has an irrevocable, non-exclusive license under said application to practice and have practiced the invention claimed herein, including the unlimited right to sublicense others to practice and have practiced the claimed invention for any purpose whatsoever.

The present invention relates to improvements in axial flow compressors of the type having variable stator vanes and, more particularly, to an improved connection between the stator vanes and the linkage mechanism controlling movement thereof.

In a variable geometry axial flow compressor selected circumferential rows of stator vanes are pivotally adjusted about axes radial of the compressor to control air flow and its angle of attack. This enables maximum flow efficiency to be obtained and also provides a mechanism for avoiding, or minimizing, a stall in the compressor. It is essential that the mechanism for adjusting the angular relationship of the stator vanes be accurate, have a long life with a minimum of maintenance required, and further be light in weight to meet the inherent requirements of gas turbine engines used in the propulsion of aircraft. It is further required that the stator-adjusting mechanism be simple, economical to manufacture, and accessible for repair of the mechanism itself or the stator blades, as might be required in normal maintenance and overhaul of the engine.

In a more specific sense one of the more difficult problems in such mechanism is found in effecting a connection between lever arms secured to the stators and a unison ring which assures simultaneous pivotal adjustment of each stator in a given stator row. This pivotal connection inherently poses problems because of the three dimensional relative movement involved, resulting from the fact that the lever arm pivots in a plane tangential to the casing of the compressor, while the unison ring oscillates concentrically of the casing.

There have been many proposals for securing unison rings to the lever arms of stators, as evidenced by U.S. Patents 2,842,305, 2,858,062, 2,933,234, 2,936,108, 2,955,744, 3,237,918 and 3,314,595. While these proposals have been mechanically sound in providing the desired connection, each, in one way or another, has drawbacks as to maintainability, serviceability, reliability in the sense of the long wear-life, or an unduly heavy or complicated structural arrangement.

The object of the invention is to minimize, if not entirely overcome, the drawbacks and limitations existing in making a connection between a unison ring and the lever arms of variable stators in an axial flow compressor.

The invention, in the stated axial flow compressor environment, comprises a spherical journal employed to connect the lever arms of stators to a unison ring. Each spherical journal comprises a ball and socket with one of these elements being clamped to the outer surface of the unison ring so that when the unison ring is rotated about the axis of the compressor, pivotal movement is simultaneously imparted to all of the levers and stators with the relative motions between the levers and the rings being taken by the spherical journals and by flexure of the lever arms. Preferably bolts extend through the balls of the spherical journals to clamp the balls against bushings extending through and secured to the inner and outer surfaces of the unison ring.

The above and other related objects and features of the invention will be apparent from a reading of the following description of the disclosure found in the accompanying drawing and the novelty thereof pointed out in the appended claims.

In the drawing:

FIGURE 1 is a view of a gas turbine engine having an axial flow compressor and linkage mechanism for adjusting the angular positions of the stator vanes thereof;

FIGURE 2 is a longitudinal view through the casing of the axial flow compressor, illustrating the connection of one stator vane to a unison ring; and FIGURE 3 is a section taken generally on line III—III in FIGURE 2.

FIGURE 1 illustrates a typical gas turbine engine 10 having an inlet 12, at one end, to an axial flow compressor 14 which pressurizes air in the generation of a hot gas stream for discharge through a nozzle 16 to provide a propulsive force where the engine is used as the power plant for an aircraft.

The compressor 14 is of the so-called variable geometry type in which selected circumferential rows of stators are pivotally adjusted about axes radially of the compressor for optimum operation at various operating conditions of the engine. FIGURE 1 briefly illustrates the linkage mechanism for such adjustment. The stators of each adjustable row are connected by levers 18 to unison rings 20. The unison rings in turn are connected by links 22 to a lever arm 24 which is pivotally mounted at 26 on the compressor casing. An actuator 28 is connected to the opposite end of the lever arm 24 to impart pivotal movement thereto, thereby causing the unison rings 20 to oscillate about the axis of the compressor and the stators to pivot about axes radially of the compressor. Further details of this particular linkage mechanism are described in U.S. Patent 3,314,595.

FIGURES 2 and 3 illustrate in detail the connection between individual stator vane 30 and a unison ring 20. A journal 32 on the compressor casing 34 mounts the vane 30 for pivotal movement about an axis radially of the compressor. The lever 18 is secured by a bolt 36 to a stub shaft extending from the vane 30 through the journal 32. The lever 18 is thus clamped in fixed relation to the vane 30. At the outer end of the lever 18 is a spherical journal 40, comprising a socket 42 which is secured in an opening in the end of the ring 20 as by staking or swaging. Spherical journal 40 further comprises a ball 44 received by and retained in the spherical socket 42.

A bolt 46 clamps the ball 44 on the outer surface of the unison ring 20. More specifically, the bolt 46 passes through a central hole in the ball 44 and through a headed bushing 48, which extends through the outer and inner walls of the unison ring 20. A nut 50, threaded onto the inner end of the bolt 46, is tightened to securely clamp the ball 44 against the head of the bushing 48. The bushing 48, in turn, is securely held on the unison ring 20 as by swaging its lower end.

FIGURE 3 illustrates the manner in which the compound motion between the unison ring and stators is taken by the connection of the present invention. As the unison ring 20 oscillates in a clockwise direction, the lever arm 18 pivots about the ball 44 and also rotates relative thereto. The relative radially inward movement of the connection point to the fixed inner end of the lever 18 is taken by a simple flexure of the lever arm which imposes a minimum loading on the spherical journal. Thus, there is but a single wear joint at the spherical journal, as all other components of the connection are firmly clamped. Preferably, the full line showing of FIGURE 3 is the midpoint of the path of travel of the ring 20 so that the lever 18 will be flexed equal, minimum amounts at the opposite extreme position of oscillation.

It will also be noted that the unison ring 20, which may be fabricated as two shells joined together, has an essentially uninterrupted circumferential load-bearing cross section. That is, the radial side walls of the unison ring are uninterrupted and the inner and outer walls are structurally uninterrupted as the bushing 48 and bolt 46 occupy the openings created therein for the insertion of the bushings 48. The bushings 48 are provided so that the unison ring will not be collapsed in clamping the ball 44 thereon. The bushings 48 may be of hardened steel material, while the ring 20 may, itself, be formed of a relatively lightweight material such as aluminum or titanium to provide a minimum weight with the necessary rigidity to assure accuracy of the entire linkage system.

Various modifications of the described embodiment will occur to those skilled in the art and the scope of the present inventive concepts is therefore to be construed solely from the following claims.

Having thus described the invention, what is claimed as novel and desired to be secured by Letters Patent of the United States is:

1. In an axial flow compressor having at least one circumferential row of stator vanes pivotally mounted about axes radial of the compressor and linkage mechanism for adjusting the angular positions of the pivotal vanes, said linkage mechanism including:
    lever arms secured to said vanes,
    a unison ring underlying said lever arms,
    spherical journal means comprising a ball and socket for connecting each lever to the outer surface of said ring,
    means for clamping one element of each spherical journal to the outer surface of said unison ring each of said one elements being clamped in fixed axial and annular position relative to said ring, and
    means for mounting the other element of each spherical journal on the respective arms at a given distance from said vanes,
    whereby the unison ring may be rotated about the axis of said compressor to impart pivotal movement simultaneously to all of said levers and stators with the relative motions between the levers and ring being taken by the spherical journals therebetween and by flexure of said lever arms.

2. Linkage mechanism as in claim 1 wherein the ball elements of each spherical journal are clamped to the outer surface of the unison ring.

3. Linkage mechanism as in claim 2 wherein:
    the clamping means comprises a bolt passing through each ball and
    the unison ring is of generally square cross section with headed bushings projecting through its inner and outer portions and secured thereto, said unison ring being otherwise uninterrupted, said bolts extending into said bushing and clamping the ball thereagainst.

4. A linkage mechanism as in claim 3 wherein the bolts extend through the bushings and nuts threaded on their inner ends hold the bolts in clamping relationship against the balls.

References Cited

UNITED STATES PATENTS

| | | | |
|---|---|---|---|
| 2,842,305 | 7/1958 | Eckenfels et al. | 230—114 |
| 2,924,375 | 2/1960 | McKissock | 230—114 |
| 2,933,234 | 4/1960 | Neumann | 230—114 |
| 3,325,087 | 6/1967 | Davis | 253—59 |

HENRY F. RADUAZO, Primary Examiner

PO-1050
(5/69)

UNITED STATES PATENT OFFICE
CERTIFICATE OF CORRECTION

Patent No. 3,502,260　　　　　　　　　Dated March 24, 1970

Inventor(s) Bernard L. Koff

It is certified that error appears in the above-identified patent and that said Letters Patent are hereby corrected as shown below:

Column 4, line 11, before "position" delete annular and insert in place thereof --angular--.

Signed and sealed this 4th day of August 1970.

(SEAL)
Attest:

EDWARD M. FLETCHER, JR.　　　　　　WILLIAM E. SCHUYLER, JR.
Attesting Officer　　　　　　　　　　Commissioner of Patents